UNITED STATES PATENT OFFICE.

CHARLES DE LA HARPE AND CHARLES VAUCHER, OF BASLE, SWITZERLAND, ASSIGNORS TO L. DURAND, HUGUENIN & CO., OF SAME PLACE, ST. FONS, FRANCE, AND HÜNINGEN, GERMANY.

BLUE DYE FROM GALLOCYANIN AND PROCESS OF MAKING SAME.

SPECIFICATION forming part of Letters Patent No. 613,578, dated November 1, 1898.

Application filed January 21, 1898. Serial No. 667,484. (No specimens.)

*To all whom it may concern:*

Be it known that we, CHARLES DE LA HARPE and CHARLES VAUCHER, chemists, citizens of the Swiss Republic, and residents of Basle, Switzerland, have invented certain Improvements in the Manufacture of Gallocyanin Dyes, of which the following is a clear and complete specification.

We have discovered that the gallocyanin dye resulting from the action of hydrochlorate of nitrosodiethylanilin or of hydrochlorate of diethylamidoazo-benzene upon gallamic acid, described in the patent to Krekeler and Krais, No. 518,458, dated April 17, 1894, gives by its treatment with sulfurous acid, in a free state or in the form of a sulfite or bisulfite, a new coloring-matter which is chemically and physically different from the original gallocyanin dye. This coloring-matter gives on the fiber, as chrome-mordanted wool, much bluer tints than the original gallocyanin dye from which it is derived.

The production of the new coloring-matter will be clearly understood by the following examples:

Example 1: Fifty kilos of the gallocyanin dye resulting from the action of hydrochlorate of nitrosodiethylanilin or of hydrochlorate of diethylamidoazo-benzene upon gallamic acid, four hundred liters of water, and forty kilos of neutral sodium sulfite are introduced successively into an enameled autoclave or any other suitable vessel which may be closed by a cover and will resist the chemical agents employed and is capable of supporting a certain pressure. After the mixture has stood for a long time at the ordinary temperature or after the mixture has been heated during some hours at, for instance, a temperature of 100° centigrade the transformation is effected and the mass assumes a dark-green color, which turns rapidly to a dark blue by contact with the air.

Example 2: Fifty kilos of the gallocyanin dye resulting from the action of hydrochlorate of nitrosodiethylanilin or of hydrochlorate of diethylamidoazo-benzene upon gallamic acid, four hundred liters of water, and forty-five kilos of sodium bisulfite of 38° to 40° Baumé are introduced successively into the vessel specified in the foregoing example, and the mixture is allowed to digest during a long time or heated for some hours at 90° to 100° centigrade until the mass shows a yellow-brown color.

Example 3: Fifty kilos of the gallocyanin dye resulting from the action of hydrochlorate of nitrosodiethylanilin or of hydrochlorate of diethylamidoazo-benzene upon gallamic acid, four hundred liters of water, fifty kilos of a solution of sodium bisulfite of 38° to 40° Baumé, and eighteen kilos of commercial hydrochloric acid or nine kilos of sulfuric acid are introduced successively into the vessel specified in the first example, and the mixture is heated, while being stirred, to about 100° centigrade until the transformation is effected—that is to say, until a sample taken from the reaction mass gives, on addition of sodium carbonate, a greenish precipitate. The originally dark-red mass will have attained a lighter red.

The product of reaction obtained according to the one or the other of the three described methods forms a paste which can be employed either directly or after the addition of an acid for dyeing and printing purposes. By dissolving this product in concentrated sulfuric acid a yellowish-green and wine-red dichroic solution is obtained, and on the addition of a very small quantity of an oxidizing agent—as nitric acid, sodium nitrite, manganese dioxid, &c.—it assumes an intense blue color, while on the addition of water to the said solution of the product in concentrated sulfuric acid, before or after oxidation, its color turns to a fuchsin-red.

The different aspects of the products obtained according to the three described examples originate from their different steps or degrees of chemical acidity. Indeed, an addition of small quantities of sodium carbonate or other alkali to the yellowish product obtained according to Example 2 or to the reddish product obtained according to Example 3 gives immediately a precipitate in the form of a greenish powder which is identical with the product obtained according to the Example 1 and is soluble in an excess of the reaction agent with a brownish-yellow color. By its contact with the air this latter solution turns rapidly to dark-blue violet. The products obtained according to the three examples can be precipitated from their solutions by means of common salt. According to the degree of acidity this precipitation is retarded or facilitated. Thus this precipitation may be obtained more easily from the slightly-colored aqueous solutions of the products of the Examples 1 and 2 than from the red acid solution of the product obtained according to the Example 3.

In paste form the product has a more or less dark-greenish color, according to the time that may have elapsed subsequent to its preparation.

In dyeing and calico-printing the new coloring-matter may be fixed upon metallic mordants, and especially upon those of chromium, and gives blue shades varying from violet blue to pure blue.

Having thus described our invention, we claim—

1. The process for the manufacture of a new coloring-matter derived from the gallocyanin dye described, the said process consisting in treating the said gallocyanin dye with sulfurous acid or its specified equivalents, substantially as described.

2. As a new article of manufacture the herein-described coloring-matter derived from the gallocyanin dye described, the said coloring-matter giving in dyeing and printing bluer tints, than the original gallocyanin dye, from which it is derived, and furnishing with concentrated sulfuric acid a yellowish-green and wine-red dichroic solution which turns to fuchsin-red by the addition of water and to blue by the addition of an oxidizing agent, substantially as set forth.

In witness whereof we have hereunto signed our names, this 8th day of January, 1898, in the presence of two subscribing witnesses.

CHARLES DE LA HARPE.
CHARLES VAUCHER.

Witnesses:
AMAND RITTER,
GEORGE GIFFORD.